(12) United States Patent
Kodali et al.

(10) Patent No.: US 10,144,812 B2
(45) Date of Patent: Dec. 4, 2018

(54) MULTI-FUNCTIONAL FATTY ACID ESTER DERIVATIVES USEFUL AS BIORENEWABLE PLASTICIZERS

(71) Applicant: Regents of the University of Minnesota, Minneapolis, MN (US)

(72) Inventors: Dharma R. Kodali, Plymouth, MN (US); Lucas J. Stolp, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 8 days.

(21) Appl. No.: 15/277,325

(22) Filed: Sep. 27, 2016

(65) Prior Publication Data

US 2017/0096542 A1   Apr. 6, 2017

Related U.S. Application Data

(60) Provisional application No. 62/237,132, filed on Oct. 5, 2015.

(51) Int. Cl.
*C08K 5/101* (2006.01)
*C08K 5/1515* (2006.01)

(52) U.S. Cl.
CPC ............ *C08K 5/101* (2013.01); *C08K 5/1515* (2013.01)

(58) Field of Classification Search
None
See application file for complete search history.

(56) References Cited

U.S. PATENT DOCUMENTS

| 2,448,602 | A | * | 9/1948 | Kester ................... C07D 303/16 530/217 |
| 2,624,680 | A | | 1/1953 | Swern |
| 4,124,558 | A | | 11/1978 | Miller et al. |
| 5,075,046 | A | | 12/1991 | Stoll |
| 6,018,063 | A | | 1/2000 | Isbell et al. |
| 6,734,241 | B1 | | 5/2004 | Nielsen et al. |
| 6,797,753 | B2 | | 9/2004 | Benecke et al. |
| 6,949,597 | B2 | | 9/2005 | Nielsen et al. |
| 7,196,124 | B2 | | 3/2007 | Paker et al. |
| 8,258,326 | B1 | | 9/2012 | Forest |
| 8,383,708 | B2 | | 2/2013 | Geng et al. |
| 8,580,985 | B2 | | 11/2013 | Thompson |
| 9,315,650 | B2 | | 4/2016 | Kodali et al. |
| 2006/0020062 | A1 | * | 1/2006 | Bloom ................. C07D 303/42 524/114 |
| 2008/0200595 | A1 | | 8/2008 | Hinault et al. |
| 2010/0010127 | A1 | | 1/2010 | Barki et al. |
| 2010/0154292 | A1 | | 6/2010 | Zhou et al. |
| 2012/0085568 | A1 | * | 4/2012 | Eaton .................. C08K 5/1515 174/113 R |
| 2012/0289727 | A1 | | 11/2012 | Cordeiro et al. |
| 2013/0053589 | A1 | | 2/2013 | Forest et al. |
| 2013/0131302 | A1 | | 5/2013 | Suppes et al. |
| 2013/0228097 | A1 | | 9/2013 | Kodali et al. |
| 2013/0324754 | A1 | | 12/2013 | Bredsguard et al. |
| 2014/0213709 | A1 | | 7/2014 | Dakka et al. |
| 2016/0009673 | A1 | | 1/2016 | Kazemizadeh et al. |
| 2016/0108206 | A1 | | 4/2016 | Kodali et al. |

FOREIGN PATENT DOCUMENTS

| DE | 4433958 | 3/1996 |
| WO | WO 2009033240 | 3/2009 |
| WO | WO 2009138508 | 11/2009 |
| WO | WO 2011021107 | 2/2011 |
| WO | WO 2011041380 | 4/2011 |
| WO | WO 2011046736 | 4/2011 |
| WO | WO 2012036913 | 3/2012 |
| WO | WO 2012173666 | 12/2012 |
| WO | WO 2014197327 | 12/2014 |

OTHER PUBLICATIONS

International Preliminary Report on Patentability for PCT/US2011/050200, dated Mar. 28, 2013, 5 pages.
International Preliminary Report on Patentability for PCT/US2014/040306, dated Dec. 17, 2014, 7 pages.
International Search Report and Written Opinion for PCT/US2011/050200, dated Apr. 25, 2012, 9 pages.
International Search Report and Written Opinion for PCT/US2014/040306, dated Oct. 15, 2014, 11 pages.
Third-Party Submission under 37 CFR 1.290, Apr. 28, 2016, 7 pages.
"Lipid Synthesis and Manufacture" p. 413, Year: 1999.
Greenspan and Gall, "epoxy fatty acid ester plasticizers," *industrial and engineering chemistry.*, 45(12):2722-2726, 1953.
Isbell., "Chemistry and physical properties of estolides," Grasad and Aceites., 62(1):8-20, 2011.

* cited by examiner

*Primary Examiner* — Robert T Butcher
(74) *Attorney, Agent, or Firm* — Fish & Richardson P.C.

(57) ABSTRACT

Compositions useful as bioplasticizers that include a functionalized fatty acid oil having an ester head group and a fatty acid backbone.

10 Claims, 4 Drawing Sheets

MULTI-FUNCTIONAL FATTY ACID ESTER DERIVATIVES USEFUL AS BIORENEWABLE PLASTICIZERS

CROSS REFERENCE TO RELATED APPLICATIONS

This application claims the benefit of priority under 35 U.S.C. 119(e) to U.S. Application No. 62/237,132 filed Oct. 5, 2015.

TECHNICAL FIELD

This invention relates to biorenewable plasticizers.

BACKGROUND

Plasticizers are non-volatile liquid compounds that impart flexibility to polymers and increase their range of end applications. The majority of plasticizers are used in the utilization of polyvinylchloride (PVC). PVC, due to its unique combination of price, performance, and versatile use, is one of the oldest and widely used high volume plastics. The PVC products formulated with various additives, range from very rigid pipes and siding to flexible flooring, sheeting, and adhesives. The compounding of PVC includes multifunctional additives that modify the properties; in general the formulations contain the polymer (resin), thermal stabilizers, fillers, plasticizers, and other specific property enhancers such as fire resistant materials. Rigid PVC may contain low levels of plasticizer usually less than 20 phr (parts per hundred parts resin) and is primarily used for pipe work, ducts, and similar applications where structural rigidity and chemical resistance is required. Flexible PVC contains high concentrations of plasticizer (up to 100+ phr) and is useful for numerous applications such as films, sheeting, cable coverings, moldings, stationary products, toys, hoses, leather goods, clothing and various furnishings.

The dominant class of plasticizers used in the vinyl industry today is the petroleum-derived phthalates. The largest produced phthalate for the vinyl industry is dioctyl phthalate (DOP). With current regulatory pressures relating to DOP in the US and Europe, many companies have replaced it with diisononyl phthalate (DINP) in recent years.

Materials derived from natural/renewable resources have been proposed as alternatives to phthalate plasticizers. One example is a fully acylated monoglyceride ester derived from hydrogenated castor oil described in U.S. Pat. No. 6,734,241 and U.S. Pat. No. 6,949,597, and sold under the name "Soft-n-Safe" by Danisco. Other examples include epoxidized fatty acid esters derived from epoxidized oils, such as linseed and soybean, trans-esterified with various polyols, as described, e.g., in U.S. Pat. No. 6,797,753.

Another example, described in WO2009/033240, features a mixture of glycerol esters containing natural fatty acyl chains and short acetoxy groups, along with fatty acid ethyl esters. It appears that the unsaturated fatty acids are not modified and there are no fatty acyl chain backbone modifications to increase the polarity. Additional examples include WO2012/036913 and WO2014/197327, which describe estolide fatty acid esters and their use as plasticizers are described.

SUMMARY

In one aspect, compositions useful as bioplasticizers are described that include a mixture of fatty acid esters, each having an ester head group and a fatty acid backbone.

Each fatty acid ester head group has the formula R—O—C(O)— where R is selected from the group consisting of branched, cyclic, or straight chain alkyl groups,

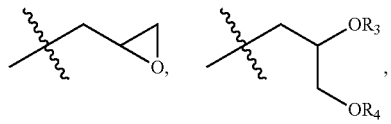

and combinations thereof, where $R^3$ and $R^4$, independently, are an alkyl or acyl group.

Each fatty acid backbone is selected from the group consisting of (i) saturated fatty acid backbones, (ii) functionalized mono-unsaturated fatty acid backbones, and (iii) functionalized polyunsaturated fatty acid backbones. The functionalized backbones include at least one pair of functional groups having the formula —$OR^1$ and —$OR^2$ where $R^1$ and $R^2$, independently, are selected from the group consisting of

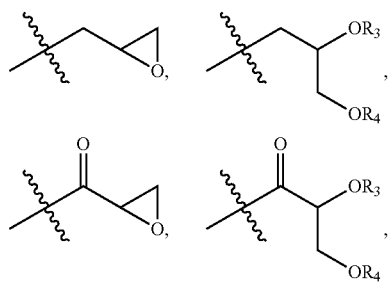

and combinations thereof, and $R^3$ and $R^4$, independently, are an alkyl or acyl group, with the proviso that at least one of the fatty acid backbones is a functionalized mono-unsaturated fatty acid backbone or a functionalized polyunsaturated fatty acid backbone.

In a second aspect, compositions useful as bioplasticizers are described that include a mixture of fatty acid esters, each having an ester head group and a fatty acid backbone.

Each ester head group has the formula R—O—C(O)— where R is selected from the group consisting of

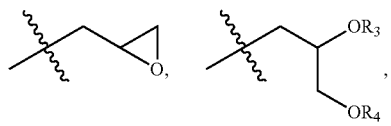

and combinations thereof, where $R^3$ and $R^4$, independently, are an alkyl or acyl group.

Each fatty acid backbone is selected from the group consisting of (i) saturated fatty acid backbones, (ii) functionalized mono-unsaturated fatty acid backbones, and (iii) functionalized polyunsaturated fatty acid backbones. The functionalized backbones include at least one pair of functional groups selected from epoxy groups or groups having the formula —$OR^1$ and —$OR^2$ where $R^1$ and $R^2$, independently, are selected from the group consisting of

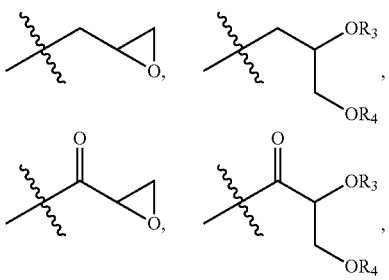

acyl, and combinations thereof, and $R^3$ and $R^4$, independently, are an alkyl or acyl group.

The fatty acid esters may be derived from oils selected from the group consisting of soybean oil, canola oil, palm oil, sunflower oil, peanut oil, castor oil, tallow oil, corn oil, and algal oil. In other embodiments, the fatty acid esters may be derived from high oleic acid oils selected from the group consisting of high oleic soybean oil, high oleic canola oil, high oleic sunflower oil, other high oleic oils produced by fermentation, and combinations thereof. In embodiments where the fatty acid backbone is derived from a polyunsaturated fatty acid backbone, the backbone may further include a cyclized group.

The compositions may be combined with a polymer matrix in an amount sufficient to plasticize the polymer matrix. Examples of suitable polymer matrix materials include polyvinyl chloride and biopolymers such as polylactides and cellulosic polymers.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Oils such as soybean, canola, corn, palm, sunflower, and tallow contain triacylglycerols (TAG) having saturated and unsaturated fatty acids esterified to glycerol. The most common saturated fatty acids present are palmitic acid (C16:0) and stearic acid (C18:0), while the most common unsaturated fatty acids are monounsaturated fatty acids such as oleic acid (C18:1) and polyunsaturated fatty acids such as linoleic acid (C18:2) and linolenic acid (C18:3).

Figure 1:
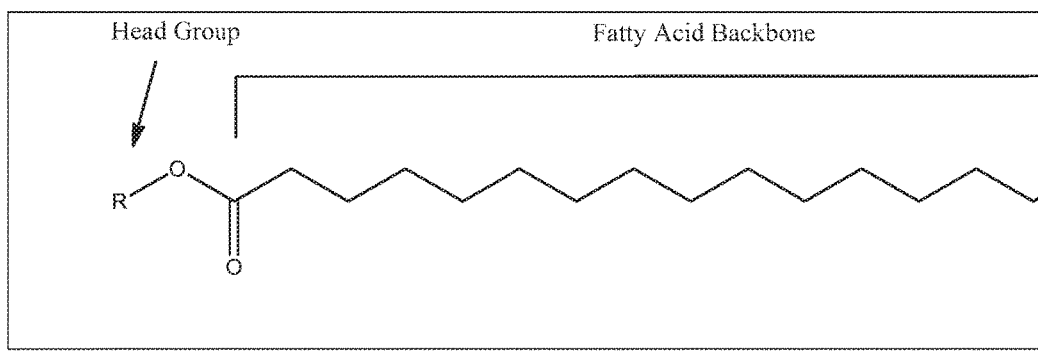
FIG. 1 is a schematic drawing showing the head group and fatty acid backbone of a fatty acid ester that act as sites for introducing functional groups.

As shown in FIG. 1, the fatty acid esters contain two distinct regions that can be modified: the head group and the fatty acid backbone. Introduction of functional groups through chemical modification at these two distinct regions create multi-functional biorenewable plasticizers. Through specific chemical modifications, various functional groups can be introduced that can enhance the plasticizer polymer molecular interactions, thereby improving the compatibility of the bioplasticizers with the polymers.

Figure 2:
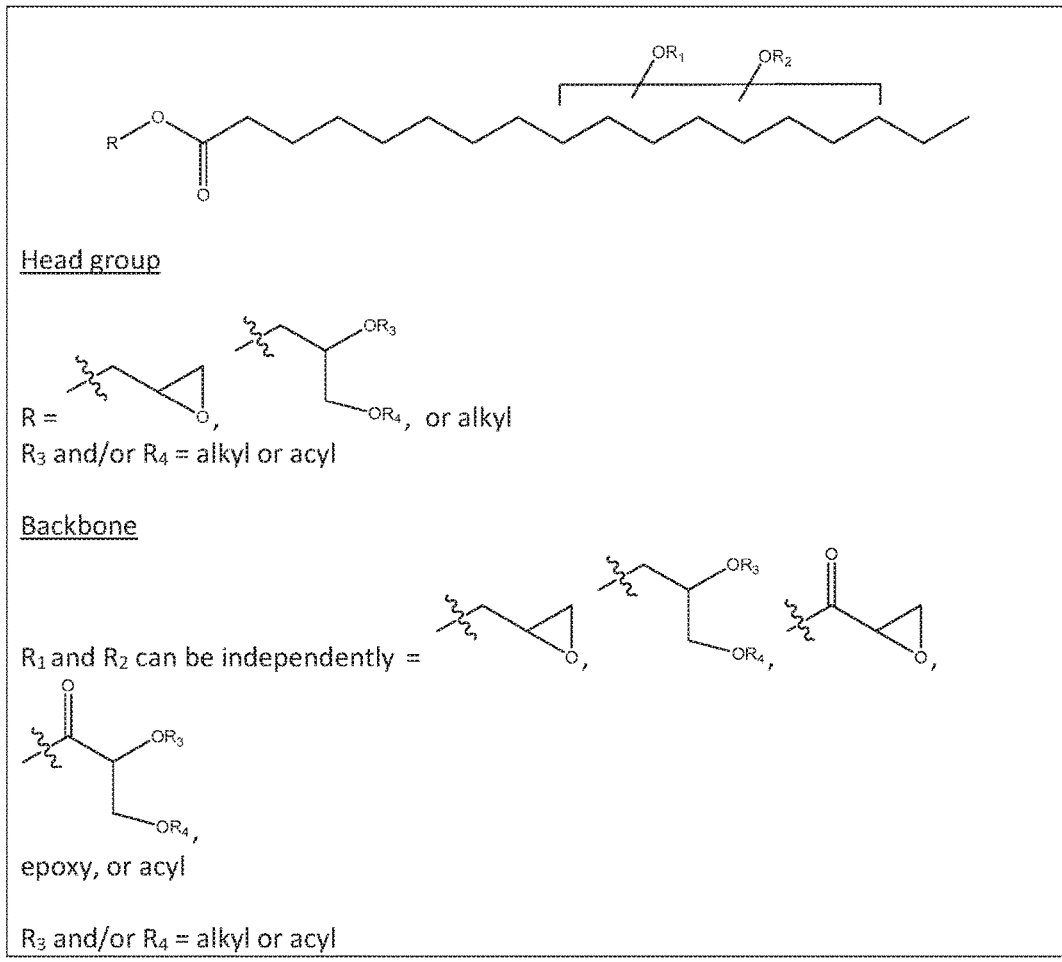
FIGS. 2 and 3 are schematic drawings showing examples of head group and fatty acid backbone modifications.

The TAG can be readily converted to lower molecular weight fatty acid esters by transesterification with various alcohols. The double bonds present in the unsaturated fatty acids serve as the reaction sites to introduce the functional groups on the fatty acid backbone. First, the double bond is converted to an epoxy functional group, which can then be ring opened with various acids or alcohols. These acids or alcohols, in turn, may also contain unsaturation, which can be further epoxidized and ring-opened with an acid or alcohol. The hydroxyls that form during the epoxide ring opening can then be alkoxylated or acetylated. Examples of various functional groups that can be created from these modifications on the fatty acid backbone are shown in FIG. 2.

The head group modifications can be introduced during the transesterification step by using simple alcohols or an alcohol-containing epoxy functional group, or alcohols containing unsaturation, which can then be converted to epoxy functional groups. The epoxy functional group present in the head group can be further ring-opened with an alcohol or acid to form hydroxyl, which can then be alkoxylated or acetylated. Examples of various functional groups that can be achieved at the head group are shown in FIG. 2. These head group modifications can introduce functional groups to saturated fatty acids that would otherwise have lower utility as plasticizers due to lower molecular weight and limited molecular interactions with the polymer matrix as a consequence of the lack of functional groups on the fatty acid backbone. The multi-functionalization of the fatty acid esters at the unsaturation sites and the head group make this technology robust and provide the best plasticizer performance. In addition, this multifunctional approach allows the use of oils that contain at least half of the fatty acids as saturated fatty acids to serve as suitable raw materials.

In some embodiments, the head group may include a combination of epoxy and acetyl groups in a weight to weight ratio of 90:10 to 10:90. In some embodiments, the fatty acid backbone may include a combination of epoxy and acetyl groups in a weight to weight ratio of 90:10 to 10:90. In yet other embodiments, the head group includes a combination of epoxy and acetyl groups in a weight to weight ratio of 90:10 to 10:90, and the fatty acid backbone includes a combination of epoxy and acetyl groups in a weight to weight ratio of 90:10 to 10:90.

Various fats and oils that could serve as raw materials. Examples include soybean, canola, palm, sunflower, peanut, castor, tallow, and corn oil, as well as their fractionated or modified products. Especially useful are the oils having high monounsaturation such as high oleic soybean, canola, or sunflower oils. Also useful are the oils produced by alternate routes such as fermentation, for example high oleic algal oil produced by Solazyme Corporation.

Figure 3:
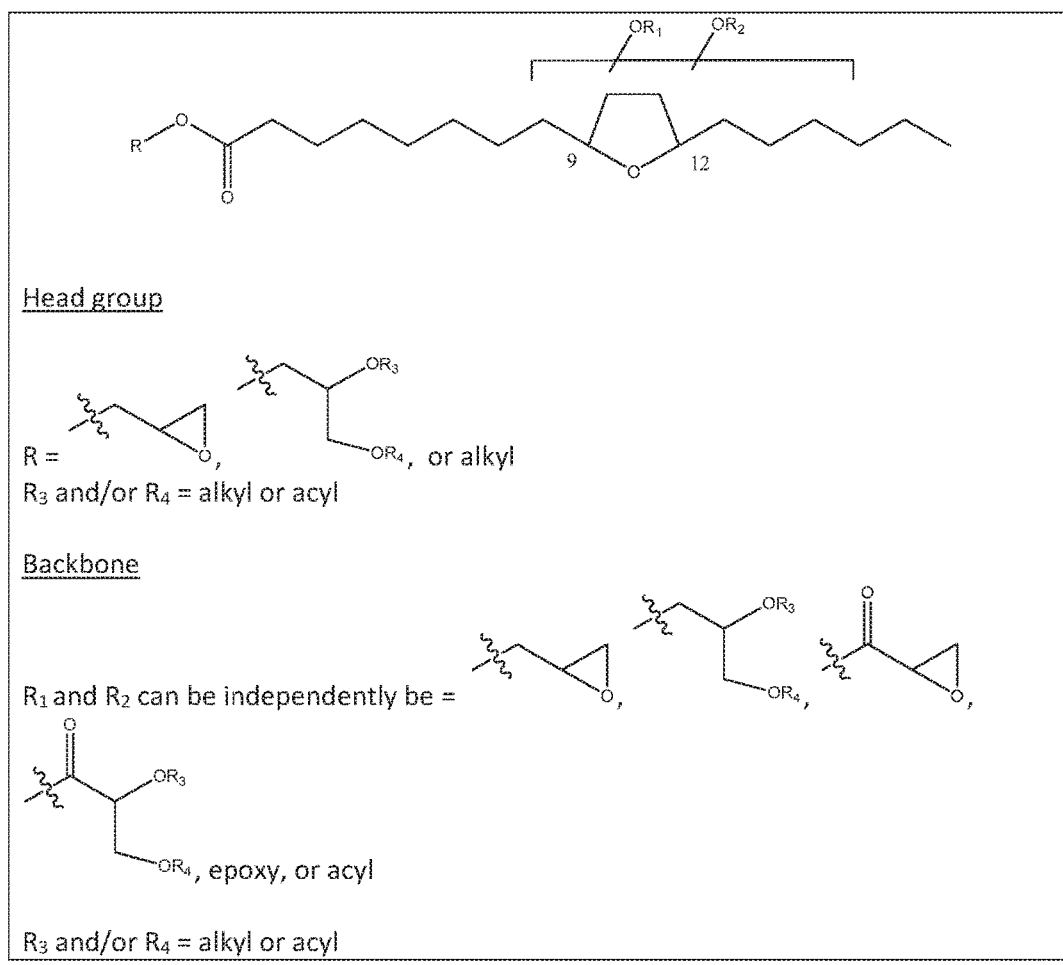

The polyunsaturated fatty acids upon epoxidation and ring opening form cyclic fatty acid structures on the back bone. For example, epoxidized linoleic acid ester upon ring opening of the first epoxide with an alcohol or acid will produce a hydroxyl function, which in turn will ring-open the adjacent epoxy function, leading to a cyclic tetrahydrofuran structure as shown in FIG. 3. Based on the position of the hydroxyl formed from the first epoxy function ring opening, this cyclic tetrahydrofuran structure may form either at carbons 9, 12 or 10, 13 on the fatty acid back bone. The formation of cyclic structures from epoxy ring opening of linolenic acid that has three double bonds will be more complicated. FIG. 3 shows the various head group and fatty acid back bone functional groups resulting from polyunsaturated fatty acid esters as an example. The ring opening of the epoxides of the polyunsaturated fatty acid esters can also oligomerize to form higher molecular weight materials.

The high oleic oils are particularly suitable raw materials for this technology due to higher homogeneity, containing more than 80% of monounsaturated fatty acid, oleic acid, and the resulting final products. The functionalization of high oleic fatty acid esters through epoxidation and ring opening are shown in FIG. 4.

Figure 4:
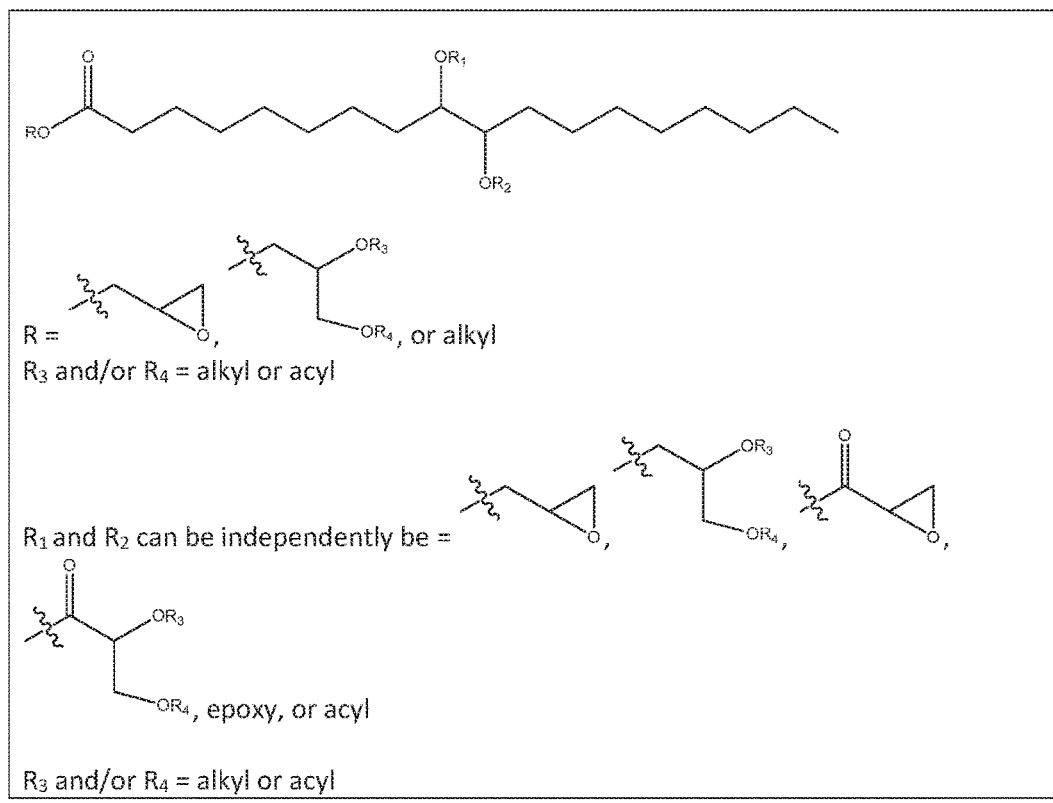
FIG. 4 is a schematic drawing showing the functionalization of high oleic fatty acid esters.

The particular chemical structures present in the bioplasticizers as shown in FIGS. 2-4 depend upon the fatty acid composition of the starting material. For example, a bioplasticizer made from soybean oil that contains monounsaturated and polyunsaturated fatty acids (oleic, linoleic, and linolenic) will have structures similar to those shown in FIGS. 2-4 based on the relative concentration of individual fatty acids. On the other hand, a bioplasticizer made from high oleic oils such as high oleic soybean or sunflower oil, which contain >80% oleic acid, will primarily have structures similar to those shown in FIG. 4.

The synthesis of bioplasticizers described in this invention can be accomplished according to the following general chemical modifications at the headgroup and the fatty acid backbone.

Head Group Modifications
1. Transesterification (TE) with various alcohols containing alkyl, allyl, or glycidyl functions
2. Epoxidation (Epox) of the unsaturation in the head group where applicable
3. Epoxy Ring Opening (ERO) of the head group with acid/alcohol where applicable
4. Capping (Cap) the hydroxyl where applicable Scheme 1: General headgroup modification scheme

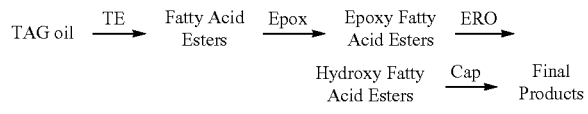

Backbone Modifications
1. Epoxidation (Epox) of the backbone
2. Epoxy Ring Opening (ERO) of the backbone with acid/alcohol
3. Capping (Cap) the hydroxyl with alkoxy or acyl function Scheme 2: General backbone modificatioon scheme

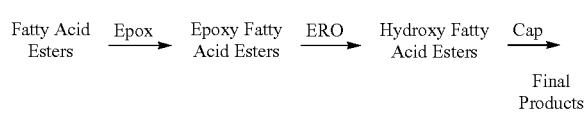

The above chemical modifications epoxidation, epoxy ring opening, or capping the hydroxyls at both the headgroup and backbone can be affected simultaneously or independently.

Reaction Schemes

Various chemical modifications to produce bioplasticizer compounds from high oleic oils and other vegetable oils are shown in Schemes 3-8.

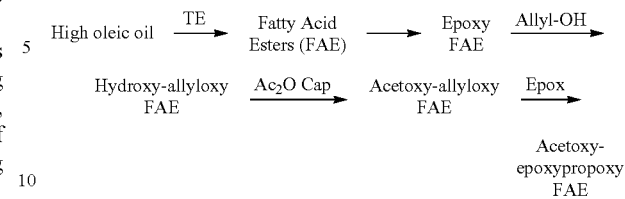

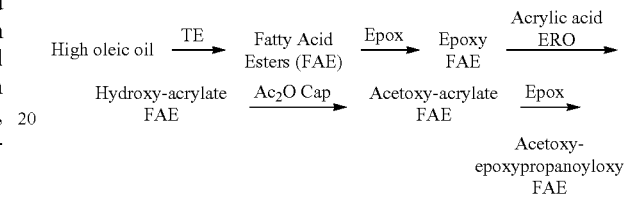

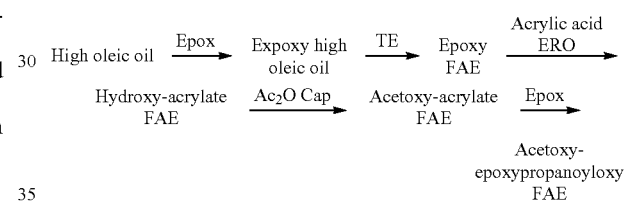

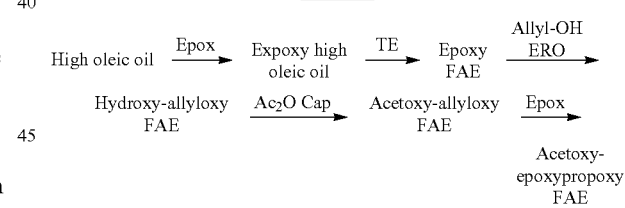

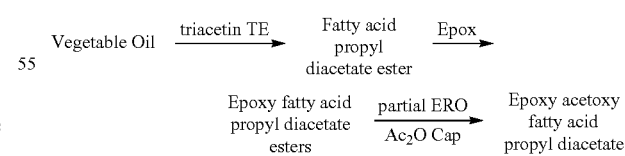

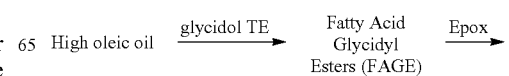

-continued

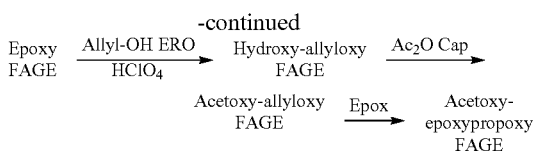

The preparation of specific fatty acid esters useful as plasticizers will now be described.
Synthetic Procedures

Example 1: Acetoxy-Epoxypropoxy Fatty Acid Methyl Esters

High oleic fatty acid methyl esters (FAME) were prepared by the transesterification of high oleic sunflower oil (HOSFO) using standard processes, resulting in a quantitative yield of the fatty acid methyl esters.

A baffled reactor equipped with mechanical stirring and a reflux condenser was charged with 1 kg of FAME, 0.5 mol per double bond of acetic acid, 1.1 mol per double bond of 50% $H_2O_2$, and 5 wt % of dried Amberlite IR 120 $H^+$ ion exchange resin. The flask was stirred at 1200 RPM and heated to 60° C. The heat was removed and the exothermic reaction was allowed to further heat the reaction mixture to 75° C. The reaction temperature was maintained at 75° C. with external cooling for 1 hour, followed by external heating for an additional 6 hours. The reaction mixture was filtered under vacuum and allowed to separate into two layers. The aqueous layer was removed and the organic layer was vacuum distilled to remove excess acetic acid. After distillation the material was stirred with 2% Magnesol and filtered under vacuum to yield Epoxy Fatty Acid Methyl Ester (EFAME) quantitatively (1.2 kg) as a pale yellow oil (Gardner color number 1).

A flask containing 150 g of EFAME prepared above was stirred at room temperature with 3 mol per double bond of allyl alcohol and 1 mL perchloric acid under an inert atmosphere for approximately 6 hours. After the completion of the reaction as monitored by TLC, the perchloric acid was neutralized with sodium bicarbonate and the excess allyl alcohol removed by distillation. After cooling, 2% Magnesol was added, stirred for 30 min, and filtered under vacuum to yield 153 g of hydroxy-allyloxy fatty acid methyl esters as a pale yellow oil (Gardner number 1).

Hydroxy-allyloxy fatty acid methyl esters (150 g) prepared above were acetylated at 90° C. with 1 mol of acetic anhydride for 8 hours. The excess acetic anhydride and acetic acid produced from the reaction were distilled under vacuum. After cooling, 2% Magnesol was added, stirred for 30 min, and filtered under vacuum to yield 158 g acetoxy-allyloxy fatty acid methyl esters as a yellow oil.

To a flask containing 100 g acetoxy-allyloxy fatty acid methyl esters prepared above dissolved in 250 mL dichloromethane was added 1.2 mol meta-chloroperbenzoic acid (m-CPBA) and stirred at room temperature until all double bonds were epoxidized (approximately 4 hours). Excess m-CPBA was quenched with 5% sodium sulfate (aq.) solution. The dichloromethane was removed in vacuo and the remaining mixture dissolved in hexanes, washed once with water, thrice with 10% bicarbonate solution, once with brine, and dried over sodium sulfate. After drying the solvent was removed in vacuo to yield 90 g acetoxy-epoxypropoxy fatty acid methyl esters as a pale yellow oil.

Example 2: Acetoxy-Epoxypropanoyloxy Fatty Acid Methyl Esters

A flask containing 100 g of EFAME was stirred at 90° C. under an inert atmosphere. Acrylic acid (1 mol equivalent per epoxy) was mixed with 0.5% hydroquinone and half of this mixture was slowly added to the stirring EFAME at 75° C. After 20 minutes 8% triphenyl phosphine was added and the temperature was increased to 90° C. at which point the remaining acrylic acid mixture was slowly added and reacted for 29 hours. The reaction mixture was cooled to room temperature, diluted with ethyl acetate, washed four times with 10% sodium bicarbonate, one time with brine, dried over sodium sulfate, and concentrated in vacuo to yield hydroxyl-acryloxy fatty acid methyl esters as a brown oil.

The hydroxyl-acryloxy fatty acid methyl esters prepared above were acetylated with 1.1 mol eq. of acetic anhydride (per hydroxyl) at 90° C. for 24 hrs. After the completion of the reaction the mixture was diluted with hexanes, washed once with water, three times with 10% sodium bicarbonate, once with brine, dried over sodium sulfate then concentrated in vacuo to yield acetoxy-acryloxy fatty acid methyl esters as a light brown oil.

The acetoxy-acryloxy fatty acid methyl esters prepared above were epoxidized by reacting with 1.2 mol eq. m-CPBA (per acrylic double bond) at room temperature for 6 days in dichloromethane. When the reaction was completed the remaining m-CPBA was neutralized by an aqueous 5% sodium sulfite solution, the dichloromethane layer was extracted three times with 10% sodium bicarbonate, once with saturated sodium chloride, dried over sodium sulfate, filtered and concentrated in vacuo to yield a acetoxy-epoxypropanoyloxy fatty acid methyl esters as a viscous light yellow oil.

Example 3: Epoxy Fatty Acid Epoxypropyl Esters

A flask containing 1 kg high oleic soybean oil (HOSBO) was heated under vacuum to 100° C. for 30 min. After cooling to 80° C., 4 eq. of allyl alcohol and 0.5% NaOMe w/w SBO were added under a nitrogen atmosphere. The reaction was maintained at 80° C. for approximately 4 hours until the disappearance of the SBO peak on TLC was confirmed. The allyl alcohol was removed by vacuum distillation resulting in the separation of the glycerol phase from the fatty acid allyl esters. The glycerol phase was removed and the crude allyl esters were stirred with 1% Magnesol and 1% activated charcoal under vacuum for 30 min. The Magnesol and charcoal were filtered under vacuum to yield fatty acid allyl esters as a light yellow oil.

The fatty acid allyl esters prepared above were epoxidized using m-CPBA using a similar procedure described in Example 1 which produced epoxy fatty acid epoxypropyl esters as a white semi-solid material.

Example 4: Acetoxy Fatty Acid Epoxypropyl Esters

A flask containing fatty acid allyl esters as prepared above were epoxidized using the acetic acid/$H_2O_2$ method described in Example 1 to exclusively produce epoxy functionality on the backbone of the fatty acid. The backbone epoxy ring was opened with 0.5 mol eq. of acetic acid and 0.5 mol eq. acetic anhydride at 90° C. for 5 hours. The allyl group was epoxidized using the m-CPBA as described in Example 1. The resulting mixture was diluted with ethyl acetate and extracted twice with 10% sodium bicarbonate, once with brine, dried over sodium sulfate, filtered under vacuum and concentrated in vacuo to yield acetoxy fatty acid epoxypropyl esters as a yellow oil.

Example 5: Epoxypropoxy-Acetoxy Fatty Acid Epoxypropyl Esters

A flask containing 500 g fatty acid allyl esters prepared as in Example 3 was epoxidized using the acetic acid/$H_2O_2$ method described in Example 1 above to produce epoxy functionality exclusively on the back bone of the fatty acid. The backbone epoxy function was ring opened with allyl alcohol. The resulting hydroxyl allyl ether is acetylated and epoxidized using the similar procedures (acetylation by acetic anhydride and epoxidation by m-CPBA) described in Example 1 above to give epoxypropoxy-acetoxy fatty acid epoxypropyl esters in quantitative yield as light yellow oil.

Example 6: Epoxypropoxy-Acetoxy Fatty Acid Pentyl Esters

A flask containing 500 g of epoxy soy fatty acid pentyl esters obtained by the transesterification of soy FAME with pentanol and epoxidized using the acetic acid/$H_2O_2$ method was stirred at room temperature while 2 mol equivalents of allyl alcohol was added under an inert atmosphere. To the reaction mixture was added 1.6 mL of 70% $HClO_4$ (0.5% w/w epoxy soy fatty acid esters). The reaction was maintained at room temperature with a cool water bath and monitored by $^1H$ NMR until the complete disappearance of the epoxy protons which occurred after about 4 hours. The $HClO_4$ was neutralized with a slight molar excess of $NaHCO_3$ and the excess allyl alcohol was removed by vacuum distillation. The distilled product was stirred with 2% Magnesol and filtered to quantitatively yield hydroxyl-allyl ether fatty acid pentyl esters as yellow oil.

The free hydroxyl group from the epoxy ring opening was acetylated with 1.1 mol equivalents of acetic anhydride at 90° C. for 5 hours. The acetic acid and remaining acetic anhydride were removed under vacuum to yield quantitatively the acetoxy-allyl fatty acid pentyl esters as an orange/red oil.

The allyl ether functionality was epoxidized with m-CPBA using the same procedure as in Example 1 above. The procedure quantitatively yielded the epoxypropoxy-acetoxy fatty acid pentyl esters as a light yellow oil.

Example 7: Epoxy Fatty Acid Propyl Diacetate Esters

A flask containing 500 g HOSBO and 750 g triacetin (6 mol equivalents) was heated to 100° C. under vacuum for 1 hour to remove moisture. To the flask was added 1.50 g sodium (0.3% w/w SBO) and reacted until the disappearance of the HOSBO spot on TLC was observed. The reaction mixture was stirred with 1% Magnesol and 1% activated charcoal followed by vacuum filtration through diatomaceous earth. The filtrate was distilled under high vacuum to remove the excess triacetin to yield fatty acid propyl diacetate esters as a light brown oil.

The fatty acid propyl diacetate esters were epoxidized using the acetic acid/$H_2O_2$ method from example 1 to give epoxy fatty acid propyl diacetate esters as a light yellow oil in quantitative yield.

Example 8: Mixture of Epoxypropoxy-Acetoxy Fatty Acid Methyl Esters and Epoxypropoxy-Acetoxy Fatty Acid Epoxypropyl Esters High oleic fatty acid methyl esters were prepared from HOSBO by transesterification and epoxidized by the acetic acid/$H_2O_2$ procedure used in example 1 to give EFAME. The ring opening of EFAME with allyl alcohol was accomplished by a similar procedure as in Example 1. After the addition of $NaHCO_3$ to neutralize the $HClO_4$ the reaction mixture was stirred at room temperature for an additional 3 days, resulting in head group ester exchange with allyl alcohol to form a mixture of esters having methyl:allyl in the ratio of 2:1. The acetylation with acetic anhydride and epoxidation with m-CPBA procedures from above were repeated with this material to give epoxypropoxy-acetoxy fatty acid methyl esters and epoxypropoxy-acetoxy fatty acid epoxypropyl esters as light yellow oil in quantitative yield.

Example 9: Mixture of Acetoxy Fatty Acid Epoxypropyl Esters and Epoxy Fatty Acid Propyl Diacetate Esters Epoxy fatty acid epoxypropyl esters as prepared in Example 3 were ring opened and acetylated with acetic acid and acetic anhydride, resulting in a mixture of backbone epoxy ring opened product and head group epoxy ring opened product in a ratio of about 1:1 over 5 hours of reaction. The reaction yielded a quantitative amount of acetoxy fatty acid epoxypropyl esters and epoxy fatty acid propyl diacetate esters as light yellow oil.

Plasticizer Evaluation

The experimental products prepared from the examples above were evaluated as plasticizers in PVC. Two commercial plasticizers, diisononyl phthalate (DINP) and 1,2-cyclohexane dicarboxylic acid diisononyl ester (Elatur® CH), were also evaluated for comparison. The physical properties of the experimental plasticizers were evaluated according to standard procedures and compared to the commercial controls in Table 1.

TABLE 1

| Plasticizer physical properties | | | | |
| --- | --- | --- | --- | --- |
| Plasticizer | Acid Value (mg KOH/g) | Oxirane Oxygen (%) | Viscosity (cP) | Color (Gardner) |
| DINP | <0.1 | — | 76 | 1 |
| Elatur ® CH | <0.1 | — | 50 | 1 |
| Ex 1 | — | 1.82 | 84.3 | 1 |
| Ex 4 | 20.91 | 2.73 | — | 1 |
| Ex 5 | 20.96 | 3.78 | — | 1 |
| Ex 6 | — | 1.46 | 94.8 | 1 |
| Ex 8 | — | — | — | 1 |
| Ex 9 | 8.34 | 2.98 | — | 1 |

The experimental plasticizers and commercial controls were compounded with PVC in a plastisol process and evaluated for their plasticizer functionality. The general formulation for the plastisol preparation is listed in Table 2. Each formulation containing experimental plasticizer or commercial control were mixed to form a paste and spread to 1 mm thickness, and then heated in a Mathis oven for 2 minutes at 200° C. to form a plastisol film. The film thus formed was evaluated using standard testing methods to determine the plasticizer functional properties.

TABLE 2

| Plastisol formulation | |
|---|---|
| Standard Plastisol Formulation | phr |
| PVC (Vestolit B7021 ultra) | 100 |
| Plasticizer | 50 |
| ESBO (Drapex 39) | 3 |
| Ca/Zn stabilizer (Mark CZ 149) | 2 |

The volatility of the plasticized films was measured as a weight loss after exposing to 100° C. oven for 3 days and 7 days. The change in weight percent of the films at 3 and 7 days is listed in Table 3. The extractability of the plasticizers by water was measured by submerging the plasticized films under water and determining the weight change after 3 days, 7 days, and after drying and are shown in Table-3.

TABLE 3

| Plasticizer | Volatility at 100° C., 3 d (Δ wt %) | Volatility at 100° C., 7 d (Δ wt %) | Water extraction 3 d (Δ wt %) | Water extraction 7 d (Δ wt %) | Water extraction after drying |
|---|---|---|---|---|---|
| DINP | −3.5 | −7.0 | 0.3 | 1.1 | −0.05 |
| Elatur ® CH | −6.0 | −11.1 | 0.5 | 1.2 | −0.05 |
| Ex 1 | −6.6 | −8.1 | 0.8 | 1.6 | −0.40 |
| Ex 4 | −2.5 | −3.6 | 1.0 | 2.2 | −0.08 |
| Ex 8 | −4.5 | −5.9 | 1.4 | 2.6 | −0.09 |
| Ex 9 | −2.7 | −3.5 | 0.8 | 1.7 | −0.09 |

The gelation temperature was measured by rheometer and is listed in Table 4. The plasticizer efficiency was determined by Shore A hardness of the films and is listed in Table 4. The opacity and yellowness index of the films are also listed in Table 4.

TABLE 4

| Plastisol properties | | | | | |
|---|---|---|---|---|---|
| Plasticizer | Gelation Temperature (° C.) | Glass Transition Temperature (° C.) | Shore A Hardness | Opacity | Yellowness Index |
| DINP | 77 | −34.7 | 80 | 10.2 | 8.2 |
| Elatur ® CH | 88 | −44.0 | 83 | 9.5 | 7.6 |
| Ex 1 | 80 | −12.2 | 83 | 30.1 | 24.4 |
| Ex 4 | 78 | −12.1 | 87 | 42.4 | 34.4 |
| Ex 8 | 77 | −4.7 | 83 | 23.3 | 30.1 |
| Ex 9 | 75 | −21.1 | 2.9 | 10.2 | 8.8 |

The migration of plasticizers from the films under compression was measured according to ASTM D 3291 (or loop spew test). The exudation of plasticizers after 1, 7, and 14 days are listed in table 5.

TABLE 5

| Plastisol loop spew test[1] | | | |
|---|---|---|---|
| Plasticizer | 1 d | 7 d | 14 d |
| DINP | 0 | 0 | 0 |
| Elatur ® CH | 0 | 0 | 0 |
| Ex 1 | 0 | 1 | 1.5 |
| Ex 4 | 0 | 0 | 0 |

TABLE 5-continued

| Plastisol loop spew test[1] | | | |
|---|---|---|---|
| Plasticizer | 1 d | 7 d | 14 d |
| Ex 8 | 0 | 0 | 0 |
| Ex 9 | 0 | 0 | 0 |

[1]ASTM D 3291 (0.0 = no exudation, 0.5 = very little, 1.0 = little, 2.0 = medium, 3.0 = heavy, >3.0 = extreme)

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising a mixture of fatty acid esters, each having an ester head group and a fatty acid backbone, wherein:
   (a) each ester head group has the formula
   R—O—C(O)— where R is selected from the group consisting of branched, cyclic, or straight chain alkyl groups,

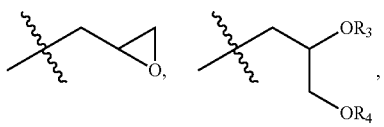

and combinations thereof, wherein $R^3$ and $R^4$, independently, are an alkyl or acyl group; and
   (b) each fatty acid backbone is selected from the group consisting of (i) functionalized mono-unsaturated fatty acid backbones, (ii) functionalized polyunsaturated fatty acid backbones, and combinations thereof, wherein the functionalized backbones include at least one pair of functional groups having the formula —$OR^1$ and —$OR^2$ where $R^1$ and $R^2$, independently, are selected from the group consisting of

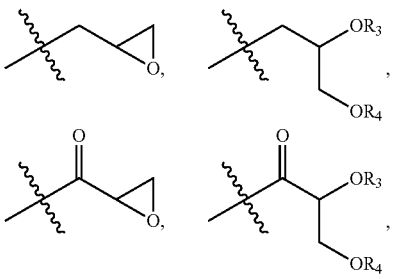

and combinations thereof,
and $R^3$ and $R^4$, independently, are an alkyl or acyl group.

2. A composition comprising a mixture of fatty acid esters, each having an ester head group and a fatty acid backbone, wherein:
   (a) each ester head group has the formula
   R—O—C(O)— where R is

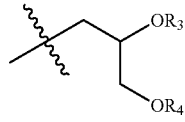

wherein R³ and R⁴, independently, are an alkyl or acyl group;
and
(b) each fatty acid backbone is selected from the group consisting of (i) functionalized mono-unsaturated fatty acid backbones, (ii) functionalized polyunsaturated fatty acid backbones, and combinations thereof, wherein the functionalized backbones include an epoxy group or at least one pair of functional groups having the formula —OR¹ and —OR² where R¹ and R², independently, are selected from the group consisting of

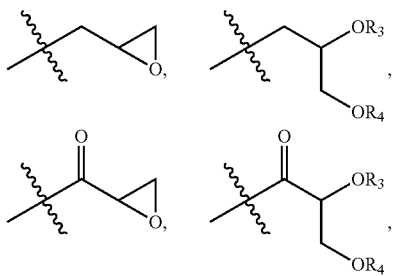

acyl groups, and combinations thereof,
and R³ and R⁴, independently, are an alkyl or acyl group.

3. The composition of claim 1 or claim 2 wherein the composition comprises a mixture of fatty acid esters derived from a fatty acid ester oil selected from the group consisting of soybean oil, canola oil, palm oil, sunflower oil, peanut oil, castor oil, tallow oil, corn oil, algal oil, and combinations thereof.

4. The composition of claim 1 or claim 2 wherein the composition comprises a mixture of fatty acid esters derived from a high oleic oil selected from the group consisting of high oleic soybean oil, high oleic canola oil, high oleic sunflower oil, high oleic algal oil, and combinations thereof.

5. The composition of claim 1 or claim 2 wherein the fatty acid backbone is a functionalized polyunsaturated fatty acid backbone that further comprises at least one cyclized group.

6. A composition comprising a polymer matrix and the composition of claim 1 or claim 2 in an amount sufficient to plasticize the polymer matrix.

7. The composition of claim 6 wherein the polymer matrix comprises polyvinyl chloride.

8. The composition of claim 6 wherein the polymer matrix comprises a biopolymer.

9. The composition of claim 8 wherein the biopolymer comprises a polylactide polymer.

10. The composition of claim 8 wherein the biopolymer comprises a cellulosic polymer.

* * * * *